United States Patent
Engel et al.

[11] Patent Number: 5,848,523
[45] Date of Patent: Dec. 15, 1998

[54] CROP FEED ARRANGEMENT

[75] Inventors: Manfred Engel, Winterbach; Karl-Heinz Bellaire, Contwig, both of Germany

[73] Assignee: Deere & Company, Moline, Ill.

[21] Appl. No.: 806,366

[22] Filed: Feb. 27, 1997

[30]     Foreign Application Priority Data

Apr. 27, 1996 [DE]   Germany ................. 196 16 999.2

[51] Int. Cl.⁶ ........................................... A01F 15/07
[52] U.S. Cl. ................................ 56/341; 100/88
[58] Field of Search ................... 56/341, 343, 344, 56/16.4 R, 432; 100/88, 89

[56]          References Cited

U.S. PATENT DOCUMENTS

| 4,766,717 | 8/1988 | Thomann | 56/341 |
| 4,970,849 | 11/1990 | Friesen | 56/344 X |
| 4,999,987 | 3/1991 | Eggenmueller | 56/341 |
| 5,595,055 | 1/1997 | Horchler, Jr. et al. | 56/341 |

FOREIGN PATENT DOCUMENTS

| 0 064 112 B1 | 5/1981 | European Pat. Off. . |
| 0 286 766 A1 | 10/1988 | European Pat. Off. . |
| 0 470 356 A2 | 2/1992 | European Pat. Off. . |
| 40 25 467 A1 | 2/1992 | Germany . |

OTHER PUBLICATIONS

Advertising literature Wolvo Model Columbia R10–R12 "Serie 2000", date unknown.

*Primary Examiner*—Terry Lee Melius

[57]          ABSTRACT

A large round baler includes a crop feed arrangement for taking up crop deposited on the ground and for delivering it to the inlet of the baling chamber of the baler. The baling chamber has a width less than that of a pick-up forming a forward portion of the crop feed arrangement and the arrangement includes a pair of augers respectively mounted at its opposite sides for narrowing the flow of crop to a width matching that of the baling chamber. These augers are mounted on a shaft also used for supporting a plurality of dogs, of a rotary crop conveying apparatus, in laterally spaced relationship to each other along the shaft. The shaft is located below the conveying surface of the crop feed arrangement. The dogs are in the form of diametrically opposite pairs of tines which sweep the crop in an overshot fashion to move the crop towards the baling chamber inlet. A crop hold down is vertically pivotally mounted in the vicinity of each of the augers and is downwardly biased so as to aid the positive engagement of crop with the augers thereby resulting in a continuous, even inward flow of crop.

3 Claims, 4 Drawing Sheets

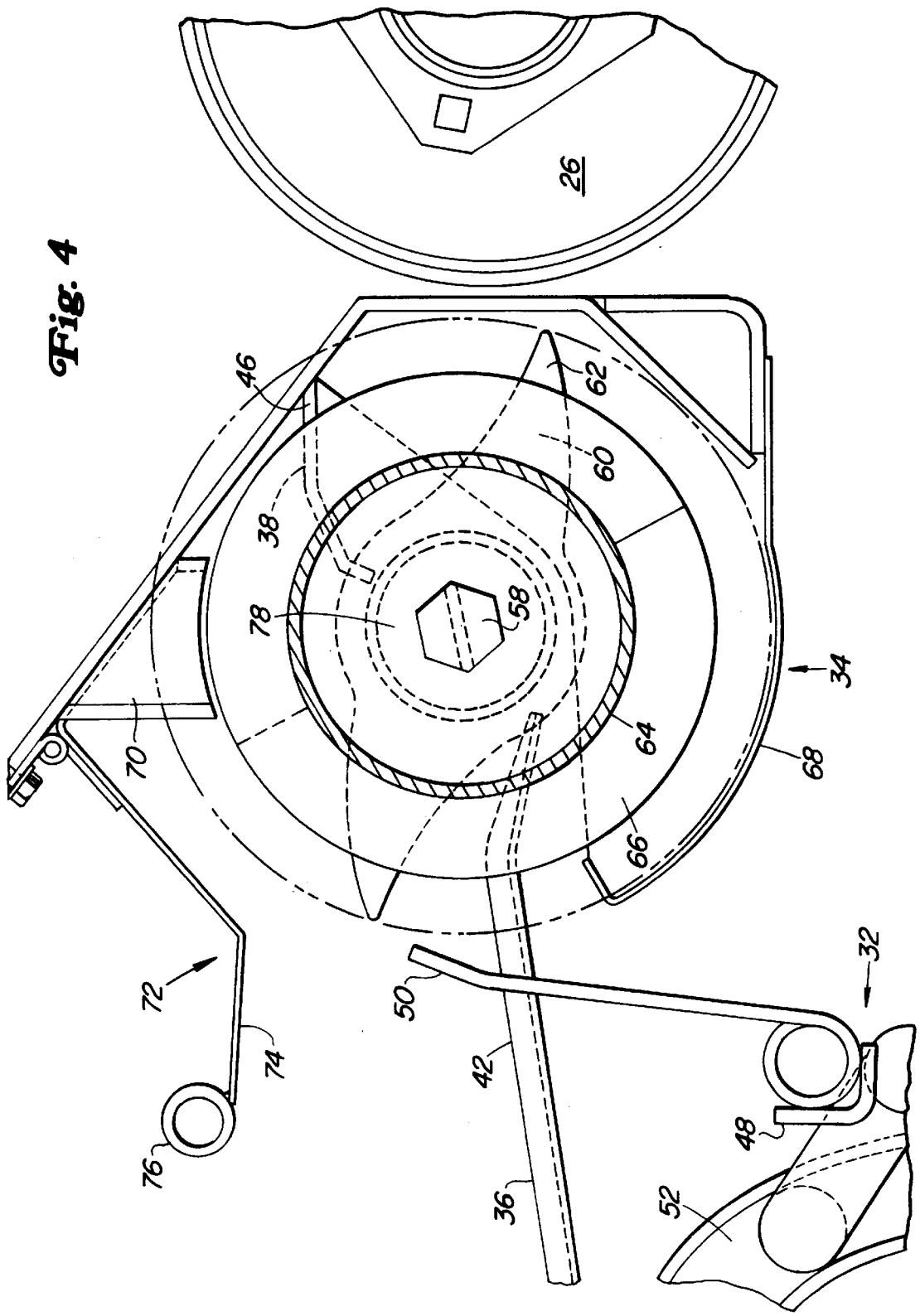

CROP FEED ARRANGEMENT

BACKGROUND OF THE INVENTION

The present invention concerns a crop feed arrangement for a harvesting machine equipped with a pick-up and an intermediate conveyor that bring the crop together in the direction of conveying.

Certain advertising literature of Wolvo, concerning its Model Columbia R10-R12 "Serie 2000" large round baler, discloses a baler having a crop feed arrangement including a leading portion which is wider than the inlet width of the baling chamber. A forward end of the feed arrangement is defined by a pick-up provided with several rows of tines that protrude through slits of a first conveyor chute and rotate so as to pick up crop from the ground and convey it overhead on the conveyor chute to the rear towards the baling chamber. Respectively provided above opposite side locations of the conveyor chute, adjacent the working area of the pick-up tines, are a pair of screw conveyors that crowd the crop toward the center of the feed arrangement. In the direction of the flow of crop, the screw conveyors are followed in the space bordered by them by a further rotary conveyor with tines that protrude upward through slits in a second conveyor chute and convey the crop to the baling chamber.

With this crop feed arrangement, it is seen as a disadvantage that three different conveyors reach into one another, which can cause delivery and transition problems.

Another large round baler is disclosed in U.S. Pat. No. 4,766,717, issued 30 Aug., 1988, and includes a pick-up using tines that are followed by a cutter arrangement that includes a shaft carrying semi-circular, spaced knives that are circumferentially offset and supported in bearings below the conveyor chute, where the knives also penetrate upward through slits in the conveyor chute and convey the crop as an overshot conveyor.

Parallel to this shaft and above the conveyor chute another rotor with tines is arranged, this rotor being driven at the same speed as the pick-up and acting along with the lower knives to force the crop rearwardly. There is no deflection of the crop towards the center of the baling chamber.

The rotor with the tines and the shaft with the knives between them traverse the passage formed between the upper and lower crop guides respectively associated with the tines and blades and thereby form a restriction that could possibly counteract the free flow of crop into the baling chamber.

A European patent specification published on 12 Feb. 1992 under No. 0 470 356 A2 teaches the configuration of a large round baler with a crop feed arrangement and a rotary conveyor that immediately follows on the downstream side. The rotary conveyor consists of a rotor with screw helices applied at the ends and acting in opposite directions, which border between them a center region with several axial rods whose width generally corresponds to the width of the inlet opening of the baling chamber. The rotary conveyor simultaneously acts as a starter roll and is therefore relatively smooth in its center region; moreover it projects relatively far upward above the conveyor chute that leaves the intake arrangement. Since this rotor simultaneously acts as a starter roll, it is not located ahead of but inside the baling chamber.

This rotary conveyor is located within the lower region of the baling chamber and thus does not fulfill any regular conveying function but rather serves primarily to form the core of a bale.

According to an European patent specification published on 19 Oct. 1988 under No. 0 286 776 A1, a baler is provided with a collecting conveyor, a so-called pick-up, which is wider than the baling chamber of the large round baler. In order to bring the width of the crop taken up to the width of the baling chamber, a pair of augers having helical flighting are respectively mounted on opposite sides just rearwardly of the pick-up, with the direction of rotation of the augers being such that they operate as overshot conveyors. A deflector, which also acts to strip crop from an associated one of the augers, is provided on each side of the collecting conveyor and acts to guide the crop to the center but no active conveying apparatus is provided there.

Finally, from an European patent specification published on 6 May 1981 under No. 0 064 112 B1, a feed arrangement for a large round baler is known in which screw helix sections at the ends and a central conveying section are also provided on a common rotor located above a conveying surface, with the central conveying section being equipped with conveying tines that penetrate into the crop and forcibly convey it into the baling chamber. The disadvantage of this solution is seen in the fact that the undershot conveying results in a compression of the crop that can result in stoppages in the conveying.

SUMMARY OF THE INVENTION

According to the present invention, there is provided an improved crop feed arrangement for conveying crop to the inlet of crop treating apparatus and more specifically there is provided such a crop feed arrangement for conveying crop to the inlet of a baling chamber of a large round baler.

A broad object of the invention is to provide a crop treating machine with a feed arrangement for uniformly delivering crop to the crop treatment apparatus without any stoppages.

A more specific object of the invention is to provide a crop treating machine with a feed arrangement including a crop pickup, which is wider than the crop treating apparatus, and to provide an intermediate crop conveying apparatus including a screw conveyor at each of opposite sides of the feed arrangement for narrowing the crop flow to the width of the crop treating apparatus, the screw conveyors being coaxially mounted relative to a tined crop feeding apparatus which is rotated together with the screw conveyors in an overshot manner.

Yet a more specific object is to provide a crop treating machine as, defined in the immediately preceding object, wherein a crop hold down is associated with each conveyor for keeping the crop in sufficient contact with the screw conveyors for being delivered in a steady stream toward the center of the crop feed arrangement.

These and other objects will become apparent from a reading of the ensuing description together with the appended drawings.

BRIEF DESCRIPTION OF THE DRAWINGS

FIG. 4 shows a section taken along line 4—4 of the crop feed arrangement of FIG. 2 but adding a stripper and hold down.

DESCRIPTION OF THE PREFERRED EMBODIMENT

Figure 1:
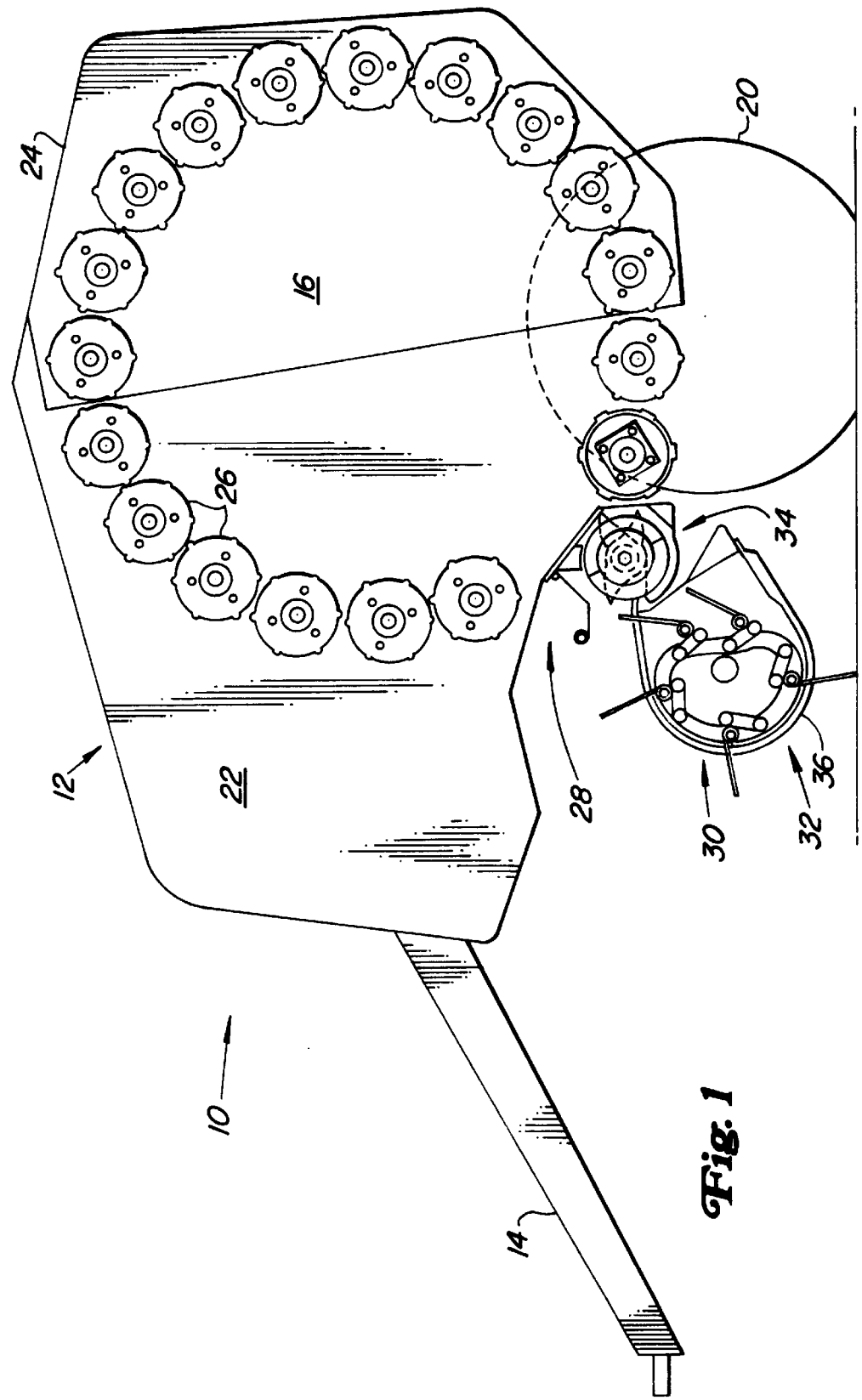
FIG. 1 shows a schematic side view of a harvesting machine equipped with a crop feed arrangement constructed according to the invention.

FIG. 1 shows a harvesting machine 10, here shown as a large round baler, having a chassis 12, a drawbar 14, a baling chamber 16 and a crop feed arrangement 18.

The harvesting machine 10 is configured as a large round baler with the baling chamber 16 being fixed. It would, of course, also be possible to apply the invention to a large round baler having a variable baling chamber or to a forage harvester, combine, mower or to a baler for making parallelepiped bales. In addition, any such baler may also be equipped with a cutter arrangement.

The chassis 12 is supported on the ground by wheels 20, and is composed of a forward section 22 and a rear flap or discharge gate 24, each including corresponding side walls, as is well know and not further described.

A drawbar 14 extends forwardly from the chassis 12 and is used for connecting the machine 10 to a towing vehicle, for example, an agricultural tractor, that tows the harvesting machine 10 across a field in order to take up crop, such as hay, straw or grass, deposited there after being mown.

The baling chamber 16 is representative of a further crop processing arrangement and, in the present embodiment, is defined by a plurality of bale-forming rolls 26, whose centerlines and, hence, centers of rotation, are generally located on a circle. The chamber 16 could be variable, in which case it would be defined by belts, chains and/or movable rolls. Obviously even in a baler with a fixed baling chamber, belts or chains may be used instead of the rolls 26. Some of the rolls 26 are supported for free rotation by bearings carried by the forward section 22 of the chassis while the remainder of the rolls 26 are likewise rotatably supported by bearings carried by the rear flap or section 24. A roll 26 is omitted from a lower front region of the baling chamber 16 thus leaving an opening forming an inlet 28 for receiving crop delivered by the crop feed arrangement 18.

The crop feed arrangement 18 is composed of a conveying surface 30, a collecting pick-up 32 and an intermediate conveyor 34, that are combined into a unit and can be pivoted vertically as a unit. The crop feed arrangement 18 is wider than the inlet 28 of the baling chamber 16. The task of the crop feed arrangement 18 is to take up crop that has been mown or threshed out, as the case may be, and left lying on the ground and to transport the crop rearwardly across the conveying surface 30 and deliver it to the baling chamber inlet 28 while converging the crop stream to the width of the inlet.

The conveying surface 30 consists of a forward conveying section 36, forming a part of the pickup 32, and a rear conveying section 38, forming part of the intermediate conveyor 34, that are so configured and arranged that the crop taken up by the pick-up 32 can slide on their upper surfaces up to the baling chamber 16.

The forward conveying section 36 is formed by a multitude of sheet metal strips 42 that are arranged alongside each other and that leave a slot 40 between them. As can best be seen in FIG. 3, the strips 42 extend forwardly from a lower rear location of the pick-up, then are curved arcuately upwardly at the front of the pick-up and then extend rearwardly to an upper rear location adjacent the intermediate conveyor 34.

The rear conveying section 38 consists of a plate 46 provided in its conveying region with slits 44 which are in fore-and-aft alignment with the slots 44 of the front conveying section 36.

Although the front and rear conveying sections 36 and 38 are arranged as separate parts in the preferred embodiment, they could equally well be manufactured as a single part.

Figure 2:
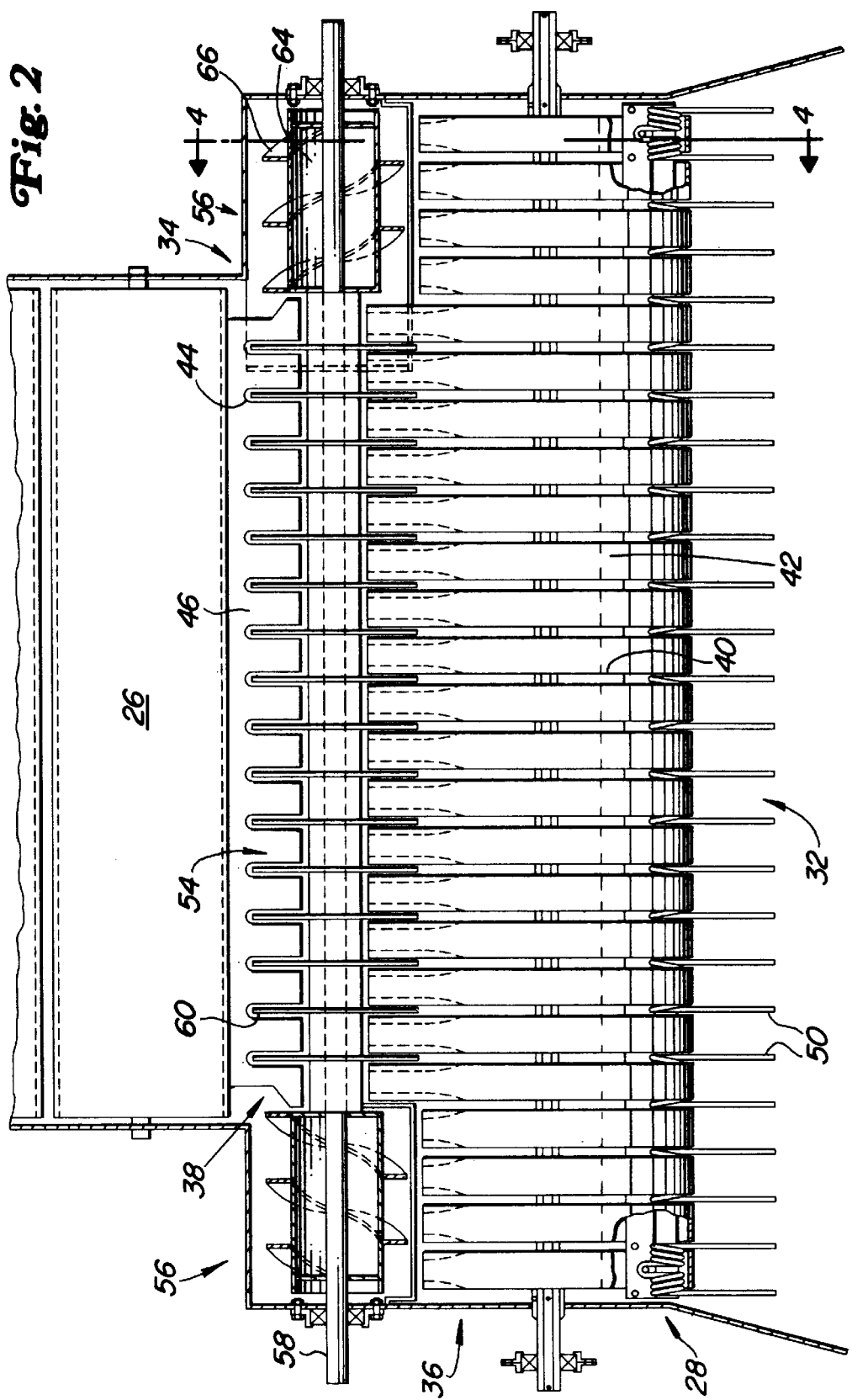
FIG. 2 shows a plan view of the crop feed arrangement of FIG. 1, but with an alternate embodiment of the auger pan being shown at the left-hand region of the intermediate conveyor.

As can best be seen in FIG. 2, the forward conveying section 36, which appears at the bottom of FIG. 2, occupies the width of the pick-up 32 and the rear conveying section 46 occupies the width of the baling chamber inlet 28.

Figure 3:
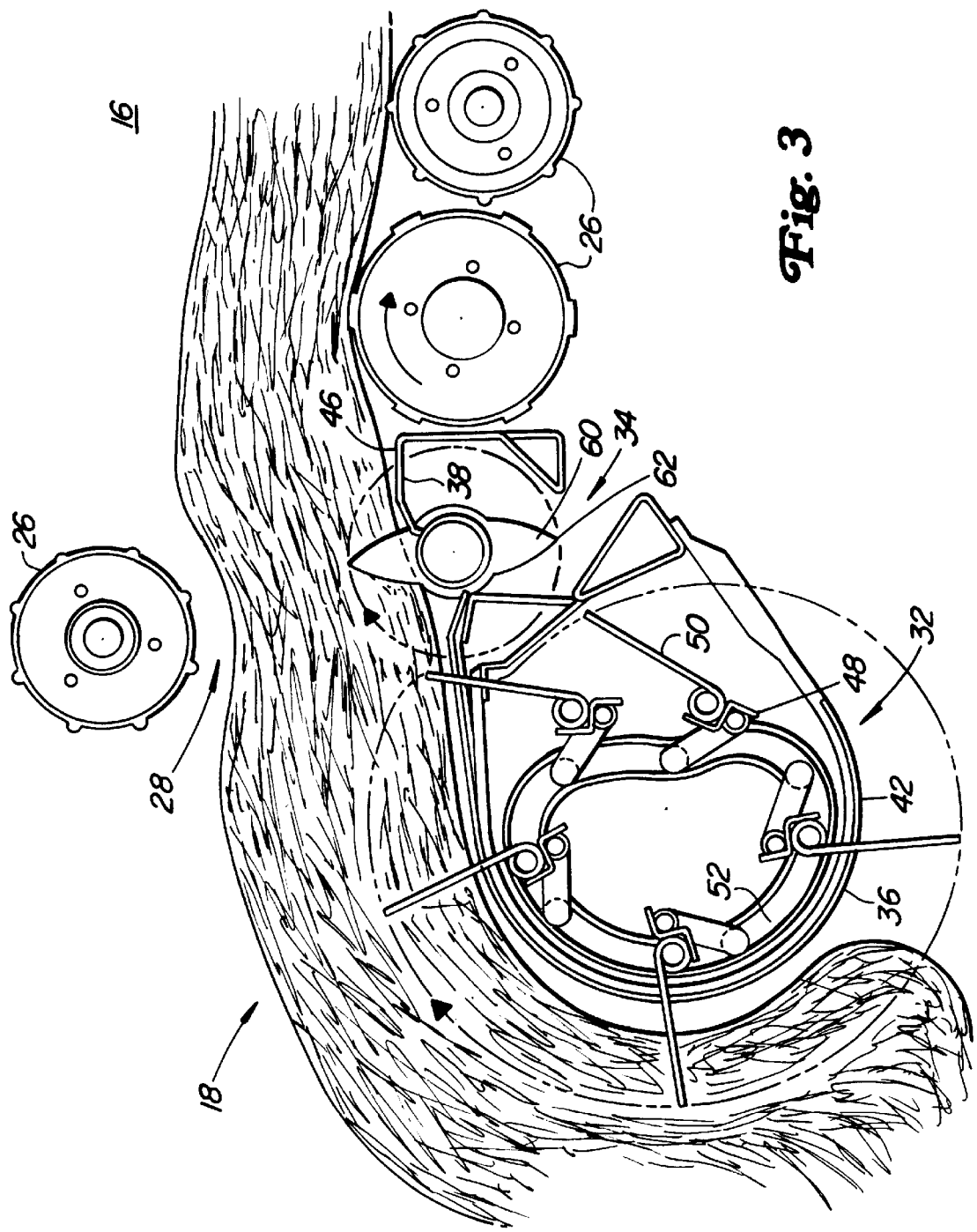
FIG. 3 shows a side view of the crop feed arrangement at an inlet region of the harvesting machine.

The pick-up 32 is configured conventionally, with tines 50 thereof being mounted on each of several rails 48 arranged transversely to the direction of travel and, as seen in FIGS. 1 and 3, being guided for moving clockwise along a curved path 52. During this rotary movement, the tines 50 extend through the slots 40 and thereby occupy various positions with respect to the sheet metal strips 42 with crop being stripped off the tines 50 at the region of the strips 42 adjacent the intermediate conveyor 34 thereby delivering the crop to the conveyor 34. The design of the pick-up 32 is well known and therefore does not require any further detailed description.

The intermediate conveyor 34 can be seen very well in FIG. 2, and consists of a center region 54 and two end regions 56. Alternatively, only one end region 56 could be provided.

A peculiarity of the intermediate conveyor 34 consists of the fact that a support shaft 58 forming part of the center region 54 also forms part of the respective end regions 56 and there includes opposite end portions that are supported in bearings whereby rotatable portions of the center and end regions are rotated together. This reduces drive components and requires little space for installation.

Another peculiarity can be seen by the fact that the axis of rotation and therewith the centerline of the intermediate conveyor 34 extends below an imaginary transverse plane extending between the rear end of an upper portion of the conveying section 36, and the forward end of the rear conveying section 38. Accordingly, the intermediate conveyor 34 operates as an overshot conveyor where the shaft 58 rotates in the clockwise direction, as indicated by the arrow in FIG. 3.

As a further characteristic, the center region 54 is equipped with a multitude of dogs 60 that are spaced from each other along the shaft 58, with each dog 60 including a pair of identically configured, diametrically opposite tines 62. The spacing of the dogs 60 corresponds to the spacing of the slots 40, or the slits 44, and the length or the spacing of the shaft 58 to the conveying surface sections 36 and 38 is selected in such a way that, in their vertical positions, the tines 62 project almost completely beyond the rear conveying section 38. The size of the slits 44 is selected so that only a small gap remains to the tines 62 so that the crop can be stripped away cleanly at the entrance to the baling chamber 16. In the preferred embodiment, sixteen dogs 60 are provided, but this is only given as an example. In any event, the overshot conveying performed by the dogs 60 is aggressive while avoiding compression of the crop and possible slugs or stoppages which sometimes occurs when crop is compressed.

In the embodiment shown, all tines 62 in the diametrically opposite groups, as viewed looking axially of the shaft 58, are aligned with one another. But, according to an embodiment not shown, the outer dogs 60 may be angularly offset, for example they may be arranged so that their tines fall along a helical path, with respect to the remaining inner dogs 60 in order to attain a continuous conveying of the crop towards the center in contrast to a possible intermittent conveying.

The circumferential speed of the collecting conveyor 32 and of the intermediate conveyor 34 is preferably the same, producing synchronous rotation with the result that the crop conveyed is transmitted uniformly and is not torn apart.

The outside diameter of the center region 54 and that of the end regions 56 are not identical, but the difference is so slight that transition problems cannot develop.

The dogs 60 are attached to the shaft 58 and spaced at a distance from one another by intervening sleeves 78 of metal or plastic applied to the shaft 58. The connection of the dogs 60 to the shaft 58 is performed either with friction locking or a step.

The end regions 56 are configured as screws conveyors operating as overshot conveyors which rotate clockwise as seen in FIG. 3, since they are attached to the same shaft 58. The configuration is designed so that a screw tube 64 occupies approximately two-thirds of the total diameter of the end region 56, while screw helices 66 occupy only one-third. Therefore and in connection with its overshot conveying, the end regions 56 operate less as screw conveyors than as deflectors, that divert the crop towards the center. Such deflectors are known from the above-identified European Patent Application published under No. 0 286 776 A1. The screw helices 66 of each of the end regions 56 are arranged as opposite hands to each other. FIG. 2 also makes it clear that the end regions 56 extend from the outer side of the pick-up 32 up to slightly within the space bordered by the side walls of the baling chamber 16.

As can best be seen in FIG. 4, a pan 68 is located under and partly surrounds the circumference of each end region 56. The purpose of the pan 68 is to avoid the loss of valuable forage when broken crop is encountered, for example, very dry hay, which otherwise would fall to the ground and be lost there. The forward edge of the pan 68 ends at the plane of the forward conveyor section 36. A stripper or deflector 70 is located above the pan 68 and extends from above to the screw helices 66 and that possibly; prevents crop from being carried along by the end regions 56 that are rotating upward which could result in blockages or problems of crop wrapping around rotating parts.

The upper side of the plate 46 of the rear conveying section 38 follows the inner ends of the scrapers 70 by an angle greater than 35° and less than 90° about the axis of the shaft 58. Also, preferably, a given set of tines 62, is positioned in an angular zone beginning 30° ahead of and ending 30° behind the angular position of the inner ends of the screw helices 66, the angular position of the tines 62, projecting forwardly from the shaft 58 as viewed in FIG. 4, lagging the inner end of the screw helix 66 by about 45°. In this way, the lead of the helices 66 of the end regions 56 is not limited too greatly and the transfer to the center region 54 occurs without any problems. The magnitude of the individual angles and the relationship of the screw tube 64 and the screw helices 66 have the result that the entire sideways movement of the crop is accomplished in from one-half to one entire revolution of the intermediate conveyor 34.

According to a further development of the crop feed arrangement 18, as shown associated with the left-hand end region 56, the pans 68 extend further inward, that is to the longitudinal center plane of the feed arrangement 18, than do the screw tube 64 and the screw helices 66 so as to define a free space at the end of each pan 68. The pans 68 are formed about the shaft 58 at a radius slightly greater than that of the outer tips of the tines 62 and the tines of the outer dog 60 of the center region 54 pass through the pan 68 and eject broken crop contained therein.

In addition, as shown in FIG. 4, each end region 56 includes a hold down 72 that consists of a flap 74, which is pivoted vertically from the chassis 12 or attached to a wall of the crop feed arrangement 18. The flap 74 is bent near its center and thereby includes a level and an inclined section. A weight 76 is welded or otherwise attached to a forward edge of the level section, with the rear of the angled section being hinged to the chassis 12 or the feed arrangement 18 for free vertical pivoting about a horizontal shaft. In place of the weight 76, a spring or the like could be provided, in order to bias the flap 74 downward, it being noted that a rear end of the flap is bent to form a stop for maintaining the flap in a position where the inclined section extends in general parallel relationship to an upper front quadrant of the circumferential surface of each of the end regions 56 and the level section extends generally horizontally from a location forwardly of the end regions. Thus the hold down 72 prevents the crop from being thrown upward and constantly holds crop in engagement with the screw helixes 66, which leads to an effective sideways conveying of the crop towards the center of the feed arrangement 18.

The speed of the pick-up 32, the intermediate conveyor 34 and the baling chamber rolls 26 is equal or generally equal, so that even when bale formation is just beginning at the inlet opening 28, no problems in the acceptance of crop can occur. The coordination of speeds and of the distance existing between the intermediate conveyor 34 and the inlet opening 28 provides the assurance that the formation of the bale proceeds without any problems and that, when net is being used to wrap a finished bale, the net does not come into contact with, and hence is not destroyed by, the intermediate conveyor 34.

In contrast to the above embodiments, the center region 54 and the end regions 56 could be driven at differing speeds despite the fact that they are supported in bearings on the same shaft 58.

We claim:

1. In a crop harvesting machine having a crop feed arrangement including a crop conveying surface provided with a plurality of transversely spaced, longitudinally extending narrow openings, and a crop processing arrangement located behind the conveying surface for receiving crop therefrom, said crop feed arrangement including a pick-up having a width greater than that of said crop processing arrangement, a pair of augers respectively located at opposite sides of said crop feed arrangement for narrowing a stream of crop being conveyed to a width substantially equaling that of the crop processing arrangement, a pan extending beneath each auger for preventing crop from being lost, and an intermediate crop conveyor including an overshot rotary apparatus having a horizontal transverse drive shaft, mounted in axial alignment with said augers, to which a plurality of dogs are respectively mounted at spaced locations therealong for sweeping respective second paths through said transversely spaced narrow openings provided in said conveying surface and engaging crop, as it leaves said pick-up and pair of augers, and delivering the crop to said crop processing arrangement, the improvement comprising: said pair of augers and said rotary apparatus being mounted for rotating about a common axis; and each pan being formed at a radius slightly larger than that of said dogs and extending inwardly beyond an inner end of the associated auger and encompassing a path of rotation of at least one of said dogs, whereby the latter sweeps through said pan to clean material moved to an inner end of the pan by the associated auger.

2. In a crop harvesting machine having a crop feed arrangement including a crop conveying surface provided with a plurality of transversely spaced, longitudinally extending narrow openings, and a crop processing arrangement located behind the conveying surface for receiving crop therefrom, said crop feed arrangement including a pick-up having a width greater than said crop processing arrangement, a pair of augers respectively located on opposite sides of said crop feed arrangement for narrowing a stream of crop being conveyed to a width substantially equaling that of the crop processing arrangement and an intermediate crop conveyor including an overshot rotary apparatus having a horizontal transverse drive shaft, mounted in axial alignment with said augers, to which a plurality of dogs are respectively mounted at spaced locations therealong for sweeping respective second paths through said transversely spaced narrow openings provided in said conveying surface and engaging crop as it leaves said pickup and pair of augers, and delivering the crop to said crop processing arrangement, the improvement comprising: an auger stripper extending inwardly and rearwardly along a peripheral region of each of said augers so as to prevent crop from being carried around the augers.

3. In a crop harvesting machine having a crop feed arrangement including a crop conveying surface provided with a plurality of transversely spaced, longitudinally extending narrow openings, and a crop processing arrangement located behind the conveying surface for receiving crop therefrom, said crop feed arrangement including a pickup having a width greater than said crop processing arrangement, a pair of augers respectively located on opposite sides of said crop feed arrangement for narrowing a stream of crop being conveyed to a width substantially equaling that of the crop processing arrangement and an intermediate crop conveyor including an overshot rotary apparatus having a horizontal transverse drive shaft, mounted in axial alignment with said augers, to which a plurality of dogs are respectively mounted at spaced locations therealong for sweeping respective second paths through said transversely spaced narrow openings provided in said conveying surface and engaging crop as it leaves said pickup and pair of augers, and delivering the crop to said crop processing arrangement, the improvement comprising: a crop hold down extending transversely above at least a respective forward portion of each of said augers; and a hinge connection mounting each hold down for vertical pivotal movement whereby the hold down may move vertically in response to crop moving therebeneath.

\* \* \* \* \*